(12) United States Patent
Eoh et al.

(10) Patent No.: US 10,473,510 B2
(45) Date of Patent: Nov. 12, 2019

(54) CONTINUOUS-TYPE LONG-RANGED MOLTEN METAL LEVEL MEASURING DEVICE AND THERMAL SYSTEM USING MULTI-POINT TEMPERATURE SENSOR

(71) Applicant: KOREA ATOMIC ENERGY RESEARCH INSTITUTE, Daejeon (KR)

(72) Inventors: Jae Hyuk Eoh, Daejeon (KR); Yong Bum Lee, Daejeon (KR); Byeongyeon Kim, Daejeon (KR); Ji-Young Jeong, Daejeon (KR)

(73) Assignee: KOREA ATOMIC ENERGY RESEARH INSTITUTE, Daejeon (KR)

( * ) Notice: Subject to any disclaimer, the term of this patent is extended or adjusted under 35 U.S.C. 154(b) by 0 days.

(21) Appl. No.: 16/162,232

(22) Filed: Oct. 16, 2018

(65) Prior Publication Data

US 2019/0113378 A1  Apr. 18, 2019

(30) Foreign Application Priority Data

Oct. 17, 2017  (KR) .................. 10-2017-0134743

(51) Int. Cl.
*G01F 23/00* (2006.01)
*G01F 23/284* (2006.01)
(Continued)

(52) U.S. Cl.
CPC .......... *G01F 23/2845* (2013.01); *B22D 2/00* (2013.01); *B22D 2/003* (2013.01); *B22D 11/18* (2013.01);
(Continued)

(58) Field of Classification Search
CPC .... G01F 23/2845; G01F 23/00; G01F 23/246; G01F 23/247; B22D 11/18; B22D 11/181; B22D 2/00; B22D 11/186; B22D 2/003
See application file for complete search history.

(56) References Cited

U.S. PATENT DOCUMENTS 3,364,745 A * 1/1968 Freedman ................. C21B 7/24
136/234
3,463,005 A * 8/1969 Hance ..................... G01N 1/125
266/87
(Continued)

FOREIGN PATENT DOCUMENTS

GB         1011205 A * 11/1965  ............ B22D 11/18
JP       02176394 A *  7/1990
(Continued)

*Primary Examiner* — Kiho Kim
(74) *Attorney, Agent, or Firm* — Klarquist Sparkman, LLP

(57) ABSTRACT

A molten metal level measuring device in a continuous molten metal level measuring device uses temperature compensation. The device includes a cylindrical bobbin, a liquid level measuring unit helically wound around an outer surface of the bobbin, a circular inner cylinder in which the bobbin and the liquid level measuring part are located and which seals the bobbin and the liquid level measuring part from the outside and has the same axial direction as the bobbin, and a cylindrical protective tube in which the inner cylinder is located and which has the same axial direction as the bobbin and has one open end. Thermocouples extend axially in the space between the inner cylinder and the protective tube, and a control unit controls the liquid level measuring part to measure a liquid level of the molten metal based on the temperatures measured by the thermocouples.

21 Claims, 8 Drawing Sheets

(51) Int. Cl.
   *B22D 2/00* (2006.01)
   *B22D 11/18* (2006.01)
   *G01F 23/24* (2006.01)

(52) U.S. Cl.
   CPC .......... *B22D 11/181* (2013.01); *B22D 11/186* (2013.01); *G01F 23/00* (2013.01); *G01F 23/246* (2013.01)

(56) References Cited

U.S. PATENT DOCUMENTS

| | | | | |
|---|---|---|---|---|
| 3,763,921 A * | 10/1973 | Behr | .................. | B22D 11/1213 164/122 |
| 3,905,243 A * | 9/1975 | Goldfuss | .............. | G01F 23/247 340/620 |
| 4,320,656 A * | 3/1982 | Tiskus | .................... | G01F 23/22 73/295 |
| 4,919,543 A * | 4/1990 | Davis | ....................... | G01K 7/02 136/234 |
| 5,020,585 A * | 6/1991 | Blazek | ................... | B22D 11/16 164/151.3 |
| 5,196,048 A * | 3/1993 | Antrim | ................. | C01B 3/0031 164/61 |
| 5,423,522 A * | 6/1995 | Forte | .................... | B22D 43/002 266/227 |
| 5,720,553 A * | 2/1998 | Falk | ....................... | G01N 25/04 374/26 |
| 6,065,867 A * | 5/2000 | Sulmont | .................... | C25C 3/20 374/139 |
| 2003/0131789 A1* | 7/2003 | Amemiya | ............... | C30B 11/00 117/200 |
| 2011/0167905 A1* | 7/2011 | Arzberger | ............. | B22D 2/003 73/295 |
| 2015/0259761 A1* | 9/2015 | Dengel | .................... | C21O 5/30 266/81 |

FOREIGN PATENT DOCUMENTS

JP           11090589 A  *  4/1999
KR   10-2007-0092967        9/2007

* cited by examiner

CONTINUOUS-TYPE LONG-RANGED MOLTEN METAL LEVEL MEASURING DEVICE AND THERMAL SYSTEM USING MULTI-POINT TEMPERATURE SENSOR

CROSS-REFERENCES TO RELATED APPLICATION

This patent application claims the benefit of priority under 35 U.S.C. § 119 from Korean Patent Application No. 10-2017-0134743, filed Oct. 17, 2017, the contents of which are incorporated herein by reference.

BACKGROUND OF THE INVENTION

1. Field of the Invention

The present disclosure relates to a long-ranged molten metal level measuring device using a multipoint temperature sensor and a thermal system including the same.

2. Description of the Related Art

Molten metal level measurement has been mainly performed by using the most fundamental method of a discontinuous electrode-type method, a continuous-type method using inductive current, a radar-type method, or the like. However, in case of the discontinuous electrode-type method, which is a traditional liquid level measuring method, unless the number of measuring devices is infinitely increased a fine change in liquid level cannot be measured. In the case of the radar-type method, there is an example in which the method is used for a high-speed breeder nuclear reactor in which some molten sodium is used as a cooling material, but application cases for molten metal level measurement are still insufficient.

The continuous-type liquid level meter using inductive current is inconvenient in that when changes in property values due to a temperature change frequently occur in a high-temperature working fluid, the temperature of the molten metal present in an adjacent position should be directly measured and temperature compensation for the measured information should be performed. In particular, in an environment wherein thermal expansion of the structure of the liquid level meter itself in a high-temperature environment, in which a reference point is changed, is formed, it is highly probable that uncertainty increases in ensuring reliability of the measured molten metal level information and in analyzing an error.

The uncertainty in such an operation characteristic and a high-temperature operation environment according to a temperature change may more seriously affect the reliability of the measured values in case of a long-range liquid level meter, that is, when the length of the meter increases. In particular, in related arts, the concept of temperature compensation should reflect, as much as possible, detailed temperature information according to a liquid level change because there are many cases in which uncertainty exists in the temperature of the molten metal. That is, when the liquid level of the molten metal is changed in an axial direction, the temperature measurement position does not coincide with an actual position at which the liquid level of molten metal is measured. There may be a change in properties such as electrical conductivity of a tube or the like surrounding a coil according to a state of direct contact with the molten metal or a noncontact state. However, there were many cases in which the temperature compensation could not actually satisfy this.

Korean Patent Publication No. 10-2007-0092967 (hereinafter, briefly referred to as "related art") is disclosed as a related art pertaining to a liquid level measuring device, a device for measuring a liquid level through a sensor including a near portion, a middle portion, and an end portion and a system including the same. However, in the related art a component was not identified which performs, in order to improve the accuracy of liquid level information, temperature compensation through measuring temperature information and integrating the measured data.

SUMMARY OF THE INVENTION

Embodiments of the present invention provide a liquid level measuring device capable of multi-point temperature measurement.

Embodiments of the present invention also provide a liquid level measuring device capable of measuring a long-range molten metal level and tracking a free liquid surface.

Embodiments of the present invention also provide a thermal system including the aforementioned liquid level measuring device.

According to an aspect of the present invention, there is provided a molten metal level measuring device in a continuous molten metal level measuring device using temperature compensation. The molten metal level measuring device includes: a cylindrical bobbin; a liquid level measuring part helically wound around an outer surface of the bobbin; a circular inner cylinder in which the bobbin and the liquid level measuring part are located and which seals the bobbin and the liquid level measuring part from the outside and has the same axial direction as the bobbin; a cylindrical protective tube in which the inner cylinder is located, and which has the same axial direction as the bobbin and has one open end; a plurality of thermocouples disposed extending in the axial direction in the space formed by the outer side of the inner cylinder and the inner side of the protective tube; and a control unit which controls the liquid level measuring part to measure a liquid level of the molten metal and outputs a corrected value of the liquid level measured from the liquid level measuring part on the basis of temperatures respectively measured by the plurality of thermocouples.

A molten metal level measuring device according to an embodiment of the present invention may further include a connection part which connects the inner cylinder and the protective tube.

In addition, the protective tube may have a plurality of through holes formed therein.

In addition, the plurality of through holes may each have a diameter of at least 4 mm.

In addition, the protective tube may have the plurality of through holes formed in an outer circumferential surface thereof within a first distance preset from one end thereof.

A molten metal level measuring device according to an embodiment of the present invention may further include a flange part formed, at a preset second distance greater than a first distance from the one end of the protective tube, so as to divide a region inside the protective tube into a first region and a second region.

In addition, the first region may be an inside of the protective tube within the preset second distance from the one end of the protective tube, and the flange part may be formed so as to seal the second region from the first region.

In addition, the preset second distance may be greater than the length of the inner cylinder.

In addition, the bobbin may be made of a Grade 91-based metal material.

In addition, the liquid level measuring part may further included: a first coil to which an alternating current is applied from the control unit; and a second coil which generates an inductive current on the basis of the alternating current.

In addition, the first and second coils may each be formed in a single coil, and may be alternately wound side by side in the axial direction of the bobbin.

In addition, the inner cylinder may be formed of a material through which current and an electromagnetic field easily pass.

In addition, the plurality of thermocouples may extend in different lengths and be disposed.

In addition, the thermocouples may each have: a fixed end connected to the flange part; and a measuring end extending from the flange part.

The length of the measuring end extending from the flange part may be adjusted.

In addition, the thermocouples may be sealed thermocouples each having the measuring end sealed from the outside.

In addition, the connection part may be formed between the plurality of thermocouples.

In addition, the control unit may calculate the corrected liquid level of the molten metal on the basis of temperature information about the molten metal, the temperature information being measured from at least one among the plurality of thermocouples.

In addition, the control unit may calculate the corrected liquid level of the molten metal by continuously collecting the temperature information about the molten metal, the temperature information being measured from the plurality of thermocouples.

In addition, the flange part may have a plurality of through holes formed therein.

According to another aspect of the present invention, there is provided a thermal system having a molten metal level measuring device inserted into the thermal system to measure the liquid level of a working fluid.

As described above, a molten metal level measuring device according to an embodiment of the present invention is capable of multipoint temperature measurement in an axial direction through a plurality of thermocouples which are disposed in different lengths around a cylindrical bobbin extending in the axial direction, and therefore has a merit of being usable for a complicated experimental apparatus and various industrial tank shapes.

In addition, the molten metal level measuring device according to an embodiment of the present invention directly applies the liquid level obtained from an inductive liquid level meter through temperature compensation on the basis of the data in which the axial direction temperature of a working fluid is directly measured, and thus has a merit in that liquid level data can be obtained with improved reliability.

In addition, the molten metal level measuring device according to an embodiment of the present invention is capable of ensuring a separation characteristic with respect to the space inside a cylinder including a flange part in which penetration part is minimized, and thus has a merit in that a measuring device is easily operated.

In addition, a thermal system according to an embodiment of the present invention has a dual structure including a molten metal level measuring device and thus has a merit in that a slight leak, which may affect the stability and performance, of a main working fluid of the thermal system can be checked in early stages.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
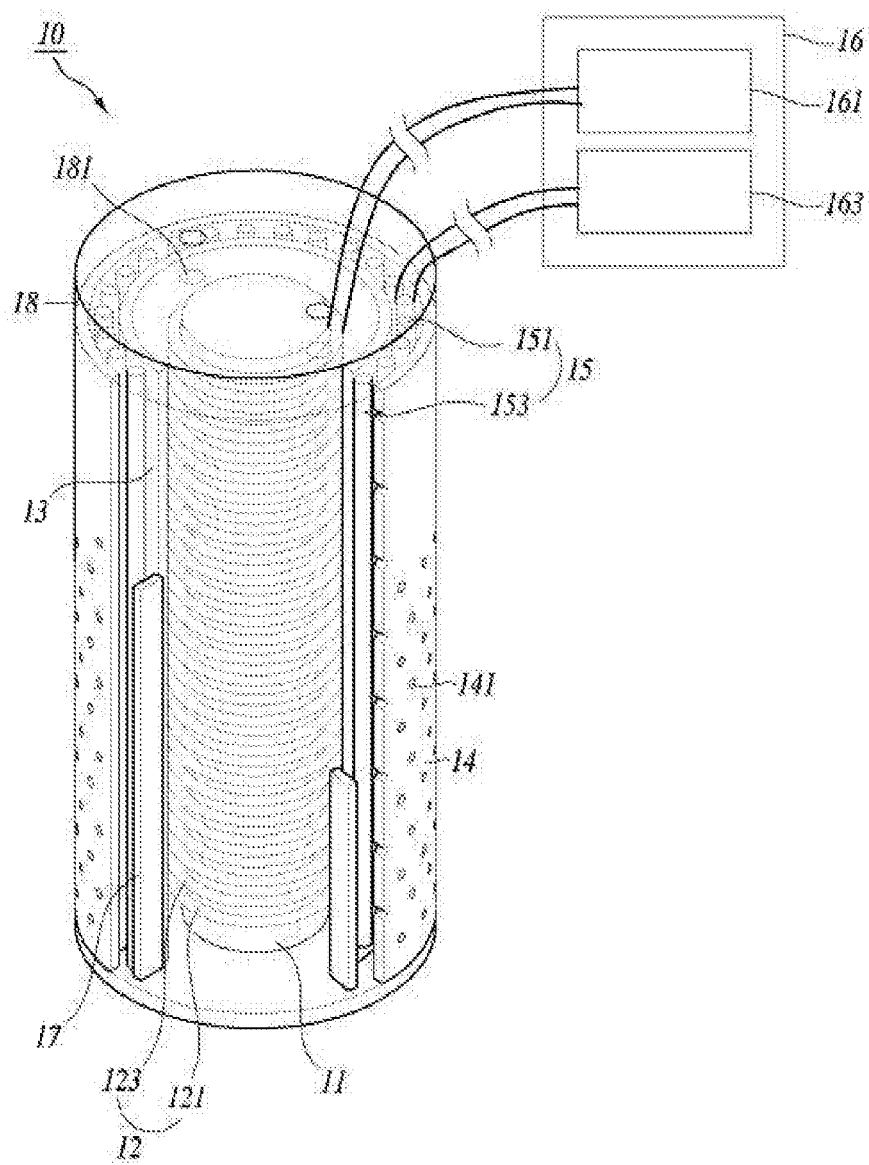
FIG. 1 is a perspective view of a molten metal level measuring device according to an embodiment of the present invention.

Hereinafter, with reference to the features disclosed in the accompanying drawings, the present invention will be described in detail. However, the present disclosure is not restricted or limited by the exemplary embodiments. Like reference numerals shown in each drawing represent members that perform actually the same function.

The objects and effects of the present invention may be naturally understood or further clarified by the following description, but are not limited by only the following description. Moreover, in describing the present invention, detailed descriptions related to well-known functions or configurations will be ruled out when determined to unnecessarily obscure subject matters of the present invention.

Figure 2:
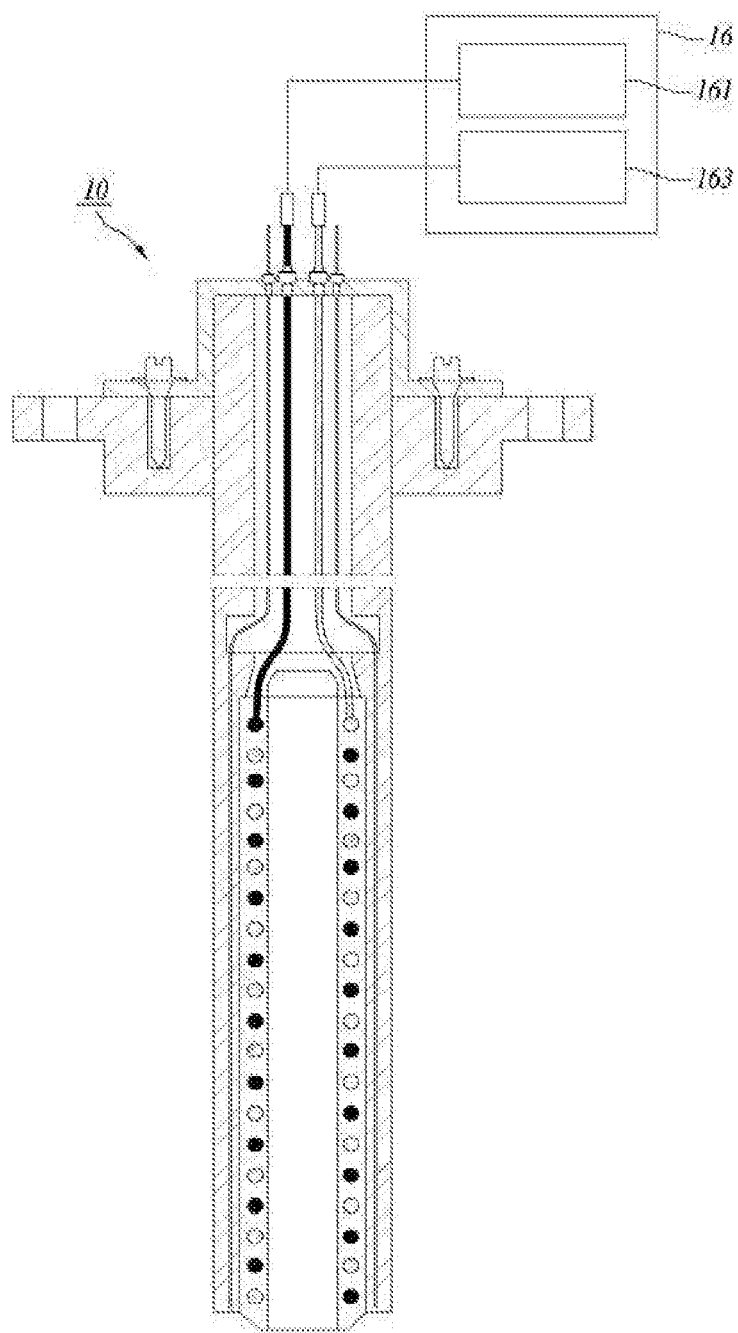
FIG. 2 is a cross-sectional view of a molten metal level measuring device according to an embodiment of the present invention.

A molten metal level measuring device 10 according to an embodiment of the present invention is capable of continuously measuring a liquid level through a pair of coils wound in a helical shape, and may improve the reliability of the liquid level of molten metal on the basis of temperature information measured at multi points. Meanwhile, the molten metal level measuring device 10 according to an embodiment of the present invention may measure the liquid level of, but not limited to, a molten metal, such as lithium, potassium, a sodium-potassium molten alloy, a lead-bismuth alloy, lead, or the like FIG. 1 is a perspective view of a molten metal level measuring device 10 according to an embodiment of the present invention. FIG. 2 is a cross-sectional view of a molten metal level measuring device 10 according to an embodiment of the present invention. Referring to FIGS. 1 and 2, the molten metal level measuring device 10 may include a bobbin 11, a liquid level measuring part 12, an inner cylinder 13, a protective tube 14, a thermocouple 15, a control unit 16, a connection part 17, and a flange part 18.

The bobbin 11 may be provided in a cylindrical shape.

In general, the bobbin is a hollow cylinder for winding a coil wire for an electrical circuit, is made of porcelain or bakelite and is used for manufacturing a resistor, a coil, and the like. As such, the bobbin 11 according to the present embodiment may be provided in a cylindrical shape, and may function as a support around which the liquid level measuring part 12 can be easily wound. The diameters of the inner cylinder 12 and the protective tube 14 may be determined according to the diameter of the bobbin 11.

The bobbin 11 may be made of a Grade 91-based metal material.

In the present embodiment, the bobbin 11 may be used under an environment exposed to a high-temperature molten metal, and a change in the volume thereof may be caused by temperatures according to the material thereof. Therefore, the reliability of the measured liquid level may be decreased. Thus, the reliability may be improved by limiting the material of the bobbin 11 to prevent a change in the volume. A material having a low thermal expansion coefficient may be used for the bobbin 11. A Grade 91 (Modified 9Cr-1Mo)-based metal may be used for the bobbin 11 to minimize the longitudinal expansion and contraction of the bobbin 11. As the change in the volume of the bobbin 11 is minimized, the precision of the molten metal level measuring device 10 may be improved. Meanwhile, a plurality of thermocouples 15 may be provided to compensate the changed volume of the bobbin 11 on the basis of the measured temperature information.

The liquid level measuring part 12 may be wound around the outer surface of the bobbin 11.

In the present embodiment, the liquid level measuring part 12 may be wound downward around the outer surface of the bobbin 11 in the axial direction from the lower end of the flange part 18. In order to continuously measure the liquid level, the liquid level measuring part 12 may continuously surround the side surface of the bobbin in a helical shape. In particular, it can be understood that the liquid level measuring part 12 may be disposed in a helical line shape without a gap therebetween and may measure all the liquid level in the axial direction. However, the liquid level measuring part 12 is preferably separated from the inner cylinder 13 in order to prevent direct contact with the molten metal.

Meanwhile, the liquid level measuring part 12 may be divided into lines for being connected to a current measuring unit and the control unit 16, and may be divided on the basis of the flange part 18. The liquid level measuring part 12 may be configured to be easily used in a high-temperature environment by using an MI cable which is coated with a mineral insulating material such as magnesium oxide (MgO) so as to be suitable for measurement. In addition, the lines may be configured by being made of an inorganic material so as to be easily used in a high-temperature environment. In particular, the current measuring part and lines may have a cable bunch or the like suitably disposed from the flange part 18 as a start point, and the flange part 18 may be provided in a sealed state except for a connection portion thereof.

The liquid level measuring part 12 may include a first coil 121 and a second coil 123. The first coil 121 and the second coil 123 each may be formed in a single coil and may be alternately wound in the axial direction of the bobbin 11.

In the present embodiment, each of the first and second coils 121 and 123 may be a coil that forms a single closed loop. The first coil 121 and the second coil 123, which are a pair of coils, may constitute the liquid level measuring part 12 and form helical lines side by side. Among the pitches formed by the first coil 121, the second coil 123 may form a helical line in spaces in which the first coil 121 is not disposed and prevent the side surfaces of the bobbin 11 from being exposed. In addition, the pitches formed by the first and second coils 121 and 123 are formed as densely as possible, and may thereby improve the accuracy of the liquid level measurement. The first and second coils 121 and 123 are formed so as not to overlap in the circumferential direction of the bobbin 11, and thus, the diameter of the inner cylinder 13 may be determined by the diameter of the bobbin 11 and the diameter of each coil. However, the molten metal level measuring device 10 according to an embodiment of the present invention is anticipated to be preferably provided in a small size, and the diameter of each coil may thereby be set within a range of 1 inch. Meanwhile, the first and second coils 121 and 123 form helical lines from the flange part 18, are connected to lead wires passing through the flange part 18, and may be connected to the control unit 16. Each of the coils constituting the liquid level measuring part 12 may be connected to the control unit 16 to thereby form a closed loop. Each coil may have the same configuration as the related measuring device using an inductive current method or may be provided in a different shape using the configuration.

An alternating current may be applied to the first coil 121 from the control unit 16.

In the present embodiment, the first coil 121 may be connected to the control unit 16 to receive current. The current applied to the first coil 121 may generate an inductive current to the molten metal and the second coil 123. As such, an alternating current is applied to the first coil 121 and the inductive current should be generated to the molten metal and the second coil 123, and subsequently according to the influence of the inductive current flowing through the molten metal, the liquid level of the molten metal may be determined through the converted output of the second coil 123.

The second coil 123 may generate the inductive current on the basis of the alternating current applied to the first coil 121.

In the present embodiment, the second coil 123 may generate an inductive current with a different output according to the alternating current applied to the first coil 121 and the inductive current of the molten metal induced by the alternating current. The inductive current generated in the second coil 123 is transmitted to the control unit 16 and may be used as data for determining the liquid level.

The inner cylinder 13 has therein the bobbin 11 and the liquid level measuring part 12, seals the bobbin 11 and the liquid level measuring part 12 from the outside, and may have a circular shape having the same axial direction as the bobbin 11.

In the present embodiment, the inner cylinder 13 may be provided to separate the bobbin 11 and the liquid level measuring part 12 from the molten metal. The diameter of the inner cylinder 13 may be determined by the diameters of the bobbin 11 and the liquid level measuring part 12. More specifically, the diameter of the inner cylinder 13 may be determined as a size which can accommodate the sum of the diameter of the bobbin 11 and the two times the diameter of the coil of the liquid level measuring part. The inner cylinder 13 has the same axial direction as the bobbin 11, may be provided in a shape of having one end sealed by the flange part 18, and the other end self-sealed. In addition, in order to provide a complete sealed state, the inner cylinder 13 may be provided in a configuration being finished by using high-quality fittings.

The inner cylinder 13 may be formed of a material through which current and an electromagnetic field easily pass.

In the present embodiment, the inner cylinder 13 is formed in order to prevent direct contact of the molten metal and the liquid level measuring part 12, but it is note that in order to measure the liquid level of the molten metal, the inner cylinder 13 should be provided using a material which can transmit the alternating current applied to the first coil 121 to the molten metal. In addition, the inner cylinder 13 may be provided using a material having a small volume change in high temperatures and excellent heat resistance because a direct contact occurs between the inner cylinder and the high-temperature molten metal.

The protective tube 14 may have a cylindrical shape in which the inner cylinder 13 is located, and which has the same axial direction as the bobbin 11 and has one open end.

In the present embodiment, the protective tube 14 may be provided in a cylindrical shape in which the inner cylinder 13 is installed therein and which is separated at least a certain distance from the outer surface of the inner cylinder 13 and has the same axial direction as the inner cylinder 13. In the protective tube 14, a plurality of thermocouples 15 are disposed in the separated space, and may thus provide a space in which the temperature of the molten metal is measured. In addition, the protective tube 14 may be provided in a structure having an open lower end, so that the inflow and discharge of the molten metal may easily be performed. The protective tube 14 may be provided by using a metal material having excellent compatibility with the molten metal and excellent heat resistance because a direct contact with the molten metal occurs.

The protective tube 14 may have a plurality of through holes 141 formed therein.

In the present embodiment, the plurality of through holes 141 may be provided in the side surface of the protective tube 14. The through holes 141 may be provided such that the molten metal flows therethrough, and thus, the thermocouples 15 and the molten metal may directly contact each other. That is, the through holes 141 may be configured to improve the temperature measuring efficiency of the thermocouples 15 and to improve integrity of the inner space of the protective tube 14.

The through holes 141 may have diameters of at least 4 mm.

In the present embodiment, the plurality of through holes 141 may be provided for easy movement of the working fluid flowing into and out of the protective tube 14. The plurality of through holes 141 may be formed so that the working fluid which is repeatedly melted and solidified does not block the through holes 141, may be provided in a sufficient size, and thus may maintain the integrity of flow. The through holes 141 may be formed in circular shapes each having a diameter of at least 5 mm. In addition, the through holes 141 may each be formed in an ellipse having the short axis with a length of at least 5 mm. The sizes of the through holes 141 may be determined within a range by which the formation of the connection part 17 is not restricted. In addition, the sizes of the through holes 141 may be determined within a range in which the intrinsic function of the protective tube 14 is performed without difficulty on the basis of the structure and the mechanical characteristics of the protective tube 14.

The plurality of through holes 141 may be formed in the outer circumferential surface of the protective tube 14 within a preset first distance from one end of the protective tube 14.

In the present embodiment, the through holes 141 may be provided in a portion of the outer circumferential surface of the protective tube 14. The one end of the protective tube 14 may be understood as the lower end of the molten metal level measuring device 10, and the plurality of through holes 141 may be formed in the outer circumferential surface within the preset first distance from the one end. The first distance is determined to be distinguished from a second distance to be described later. The first distance means an arbitrarily set distance from the one end of the protective tube, and the first distance may be formed shorter than the second distance.

The second distance may be determined as the length from the one end of the protective tube 14 to the other end of the protective tube 14. The second distance may be greater than the length of the inner cylinder 13. That is, the protective tube 14 may be formed longer than the inner cylinder 13 and bobbin 11.

The plurality of thermocouples 15 may be provided extending in the axial direction of the bobbin 11 in the space formed by the outer side of the inner cylinder 13 and the inner side of the protective tube 14.

In the present embodiment, the thermocouples 15 may be provided for measuring the temperature of the molten metal. The thermocouples 15 may be provided in plurality and measure the temperature of the molten metal at multiple points. As such, the temperature information measured from the multipoint thermocouples 15 may be transmitted to the control unit 16 and temperature compensation of the liquid level may be performed. The thermocouples 15 may be disposed extending in the same direction as the inner cylinder 13 in the space between the inner cylinder 13 and the protective tube 14, and the form of disposition is not limited thereto. The thermocouples 15 do not have limitations in the material, diameter, length, etc. thereof, and may be disposed so as not to contact each other and be separated from each other. Since performing temperature measurement through a direct contact with the molten metal, the thermocouples 15 may be provided after being surface treated with a metal material having excellent compatibility with the molten metal.

Figure 3:
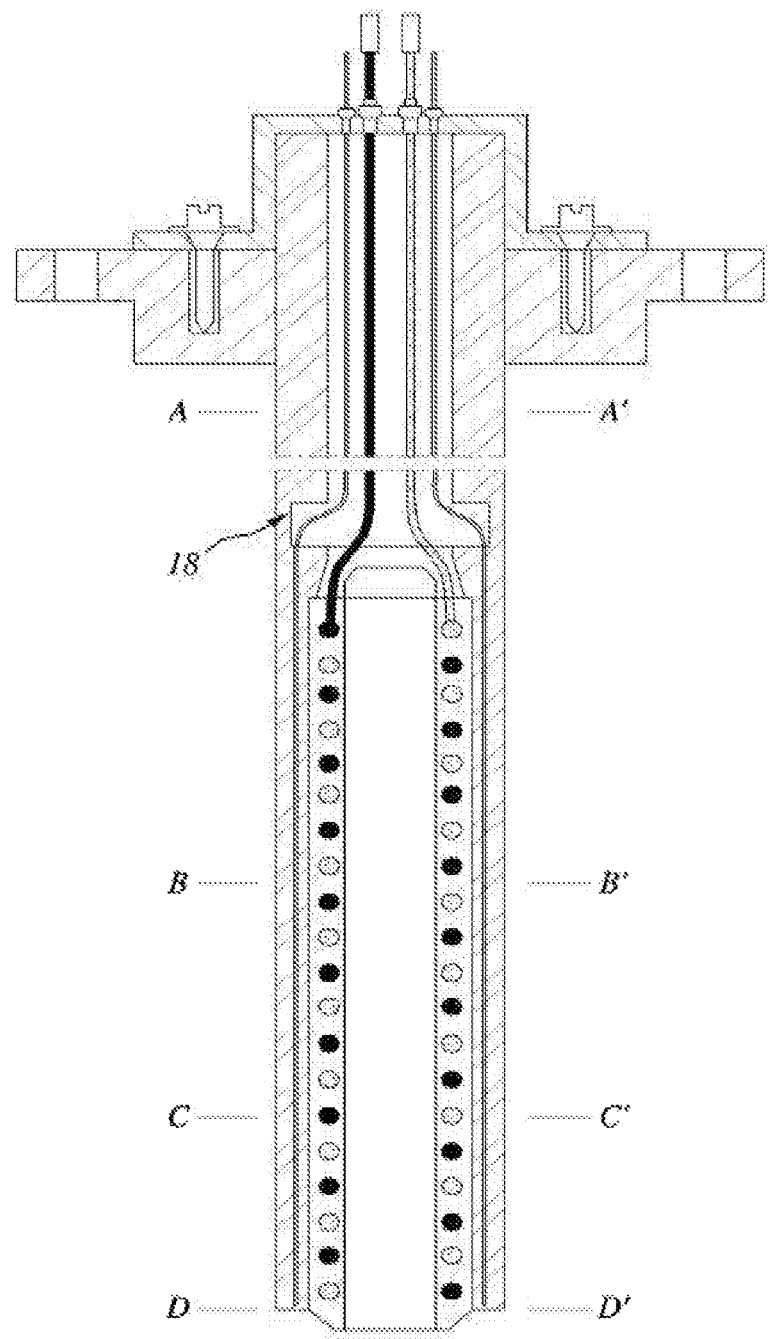
FIG. 3 shows a reference for checking a plan view for each height of a molten metal level measuring device according to an embodiment of the present invention.

FIG. 3 shows a reference for checking a plan view for each height of a molten metal level measuring device 10 according to an embodiment of the present invention. FIGS. 4 to 7 show the plan view for each reference height shown in FIG. 3.

The plurality of thermocouples 15 may be disposed extending in different lengths.

In the present embodiment, the thermocouples 15 may be provided extending in different lengths so as to measure temperatures according to various liquid levels. In particular, the length adjustment of the thermocouples 15 may be changed with reference to temperature sensors disposed according to the position of the thermocouples 15. That is, the lengths of the thermocouples 15 may be adjusted such that the thermocouples move up and down in the axial direction with respect to the flange part 18. In addition, the thermocouples 15 may each be provided in a combined type in which a temperature sensor is additionally attached on one end thereof. This is for improving the accuracy of temperature compensation according to the temperature of the molten metal, and the reliability of a liquid level may be improved according to an increase in the number of provided thermocouples 15 or an increase in the extending lengths of the thermocouples.

For example, when 12 thermocouples are disposed in the circumferential direction in the space between the inner cylinder 13 and the protective tube 14, the angle of separation between the thermocouples may be provided to be 30°. As such, the thermocouples may be disposed at regular intervals, but may also be irregularly disposed according to modification in design or user's need.

Figure 4:
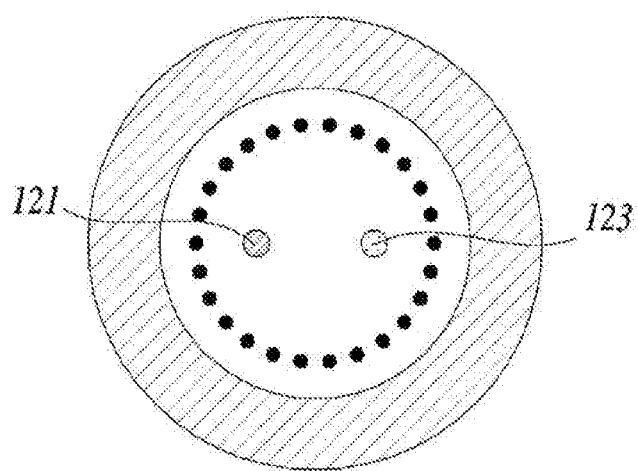
FIG. 4 is a plan view taken along line A-A' of FIG. 3.

Describing FIG. 3 in detail, four reference surfaces A-A', B-B', C-C', and D-D' were set with respect to the axial direction of the molten metal level measuring device 10. FIG. 4 shows a plan view taken with respect to surface A-A'. Since cross-sectional surface A-A' shows the upper stage of the flange part 18, it can be understood that the bobbin 11 and the inner cylinder 13 are not found. In addition, it can be understood the liquid level measuring unit 12 are not disposed in a helical shape, and each of lead wires connected to the liquid level measuring unit is found. Similarly, it can be understood that although the thermocouples 15 are not disposed, the lead wires that respectively connect the thermocouples and the control unit 16 are disposed.

Figure 5:
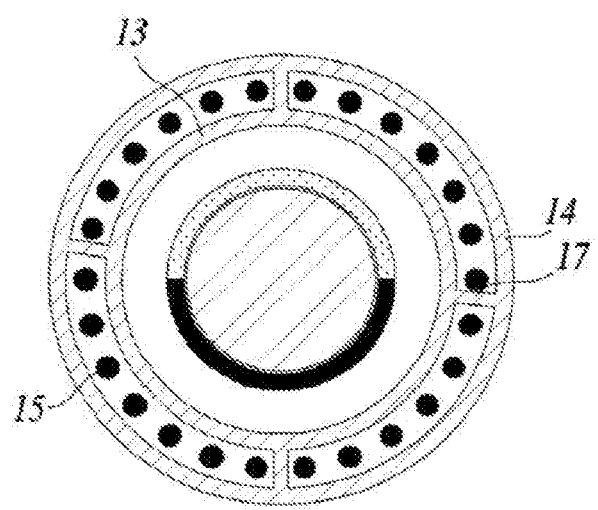
FIG. 5 is a plan view taken along B-B' of FIG. 3.

FIG. 5 shows a plan view taken with respect to surface B-B'. Since cross-sectional surface B-B' shows the lower stage of the flange part 18, it can be found that the bobbin 11 and the inner cylinder 13 are provided and the liquid level measuring unit 12 having a shape surrounding the bobbin 11 can be found. In addition, it can be understood that the connection part 17s, which connect the inner cylinder 13 and the protective tube 14, and the plurality of thermocouples 15 are disposed. However, it can be understood that the through holes 141 are not formed in the outer circumferential surface of the protective tube on surface B-B', because the outer circumferential surface is separated farther from the lower end than the first distance described above. On surface B-B', a portion of thermocouples 15 may be indentified and another portion of the thermocouples 15 may not be identified. Each of the connection parts 17 may be disposed between the thermocouples 15 and spatially separate the thermocouples. The number of spaces formed by the connection parts 17 may be smaller than or equal to the number of disposed thermocouples 15.

Figure 6:
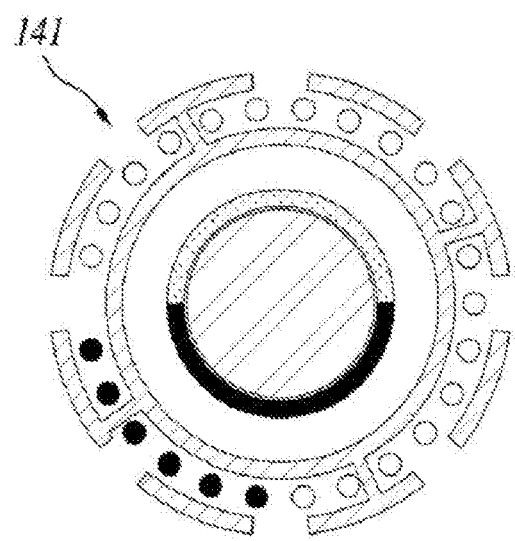
FIG. 6 is a plan view taken along C-C' of FIG. 3.

FIG. 6 shows a plan view taken with respect to surface C-C' of FIG. 3. Since cross-sectional surface C-C' also shows the lower stage of the flange part 18, it can be found that the bobbin 11 and the inner cylinder 13 are provided and the liquid level measuring unit 12 having a shape surrounding the bobbin 11 may be found. In addition, it can be understood that the connection parts 17 which connect the inner cylinder 13 and the protective tube 14 and the plurality of thermocouples 15 are disposed. However, it can be found that unlike surface B-B', surface C-C' has through holes 141 formed therein. In addition, surface C-C' has the smaller number of thermocouples 15 than surface B-B', and this may mean that the number of lengthily extending thermocouples 15 decreases toward the lower end of the protective tube 14.

Figure 7:
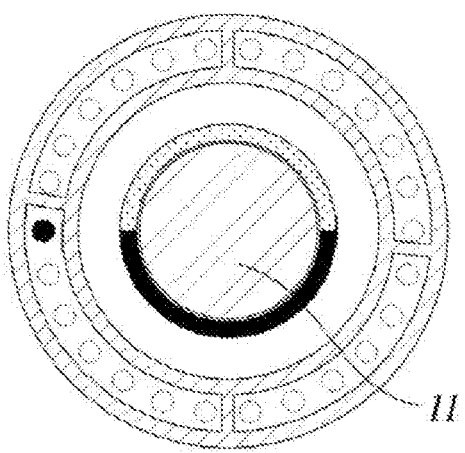
FIG. 7 is a plan view taken along D-D' of FIG. 3.

FIG. 7 shows a plan view taken with respect to surface D-D'. It can be found on cross-sectional surface D-D', like other cross-sectional surfaces of the lower stage of the flange part 18, that the bobbin 11 and the inner cylinder 13 are provided, and the liquid level measuring unit 12 having a shape surrounding the bobbin 11 may be found. In addition, it can be understood that the connection parts 17 which connect the inner cylinder 13 and the protective tube 14 and the plurality of thermocouples 15 are disposed. However, surface D-D' is the lowermost cross-sectional surface of the protective tube 14, and it can be found that a very small portion of the thermocouples 15 extends in a length reaching D-D' surface and a single thermocouple 15 is disposed in FIG. 7. Meanwhile, the through holes 141 are not shown in FIG. 7, this may be changed according to a difference in design.

Figure 8:
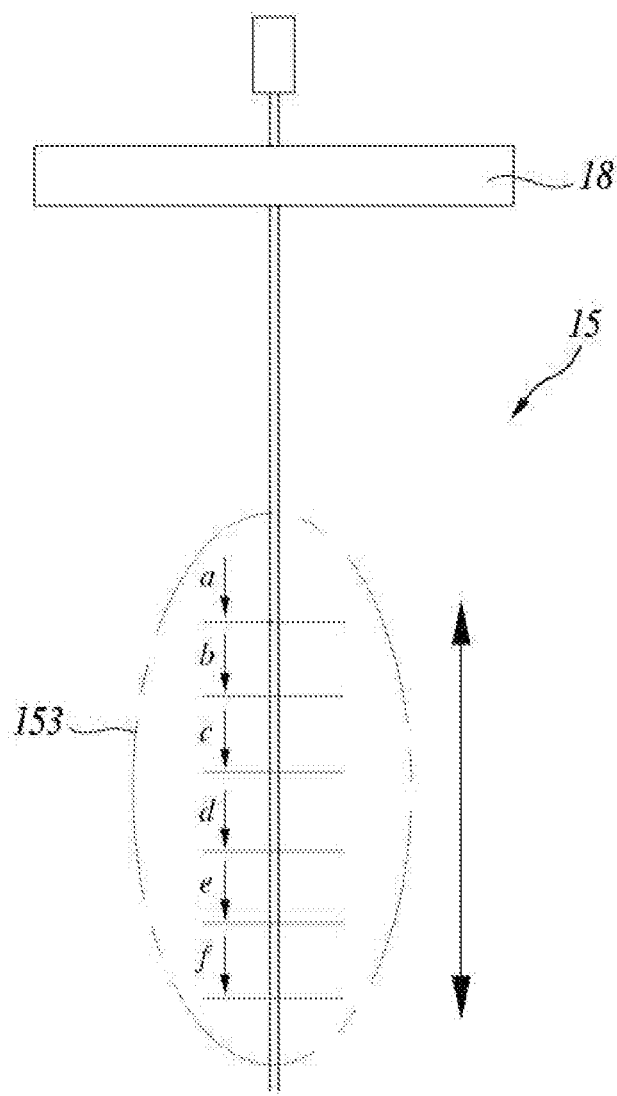
FIG. 8 shows a change in the length of a measuring end according to an embodiment of the present invention.

FIG. 8 shows a change in the length of a measuring end 153 according to an embodiment of the present invention. Referring to FIG. 8, the thermocouples 15 may each include a fixed end 151 and a measuring end 153.

The fixed end 151 may be connected to the flange part 18. The fixed end 151 may be formed of a metal material having excellent compatibility with the molten metal, and may be fixed to the flange part 18, such that the multipoint thermocouples 15 and the liquid measuring part 12 may be configured in an integrated type through the flange part 18.

The measuring end 153 may extend from the flange part 18. The measuring end 153 may have an adjustable length extending from the flange part 18.

In the present embodiment, the measuring end 153 may be defined as a portion excluding the fixed end 151. The measuring end 153 may measure the temperature of the molten metal. Since the extending lengths of the measuring ends 53 are different, the plurality of thermocouples 15 may measure the temperatures of the molten metal located at different liquid levels, and the measured data may be integrated in the control unit 16 and used as base data for temperature compensation. Referring to FIG. 8, the measuring end 153 may be modified into shapes having lengths A to F. In one example, when six thermocouples 15 are disposed in the circumferential direction in the space formed between the inner cylinder 13 and the protective tube 14, the separation angle of each thermo couple may be the same angle of 60°, and the six different thermocouples extending in one length among lengths A to F may be provided.

The thermocouples 15 may be sealed-type thermocouples in each of which the measuring end 153 is shielded from the outside.

In general, the thermocouple is a device made of two kinds of metals in order to measure a wide range of temperatures using the Seebeck effect. In particular, due to excellent durability, the thermocouple is widely used under extreme conditions. Among them, the thermocouple used for the molten metal can be used at 200° C. below zero to 1,250° C. above zero, and a K-type thermocouple having high reliability is mainly preferred due to various characteristics. The thermocouple may be classified, according to the type of contact point, into a tip exposed type, a ground type, and a non-ground type. The thermocouple 15 according to the present embodiment is expected to directly contact the high-temperature molten metal, and thus, may be provided in a sealed-type thermocouple 15 excluding the tip exposed type in which a tip for measurement is exposed.

Referring again to FIGS. 1 and 2, the control unit 16 may control the liquid level measuring unit 12 to measure the liquid level of the molten metal, and may output the corrected value of the liquid level measured from the liquid level measuring unit 12, the corrected value being corrected on the basis of each of the temperatures measured from the plurality of thermocouples 15.

In the present embodiment, the control unit 16 may receive information from each of the plurality of thermocouples 15 extending in different lengths. In particular, the temperature compensation module 163 of the control unit 16 may integrate the temperature data and transmit the integrated data to a liquid level calculation module 161.

In an example, the control unit 16 may calculate a corrected liquid level on the basis of the temperature information of the molten metal, the information being measured from at least one among the plurality of thermocouples 15.

In the example, the corrected liquid level of the molten metal can be calculated by integrating the temperature measured from the thermocouple most adjacent to the free liquid surface of the molten metal.

In another example, the control unit 16 may continuously collect the temperature information measured from the plurality of thermocouples 15 and calculate a corrected liquid level of the molten metal. In the example, the temperatures measured from all the thermocouples 15 may be integrated, and thus, the corrected liquid level of the molten metal may be calculated.

Referring again to FIGS. 1 and 5, the connection parts 17 may connect the inner cylinder 13 and the protective tube 14. In addition, the connection parts 17 may be formed between the plurality of thermocouples 15.

In the present embodiment, the connection parts 17 may be formed in a plate shape so as to connect the inner cylinder 13 and the protective tube 14. The connection parts 17 may be formed in regions in which the thermocouples are not disposed and may spatially separate the plurality of thermocouples 15. The connection part 17s may be formed in a region lower than the flange part 18. The connection part 17s may each have a limited height in the axial direction with respect to the lower end of the protective tube 14 for the integrity of the space formed between the inner cylinder 13 and the protective tube 14. The connection parts 17 may be provided in plurality.

The flange part 18 may be located at a preset second distance greater than the preset first distance from one end of the protective tube 14 and may divide the region inside the protective tube 14 into a first region and a second region.

In the present embodiment, the flange part 18 may be separated from the one end of the protective tube 14 by a distance greater than the first distance, and the distance is defined as the second distance. With respect to the flange part 18 located at the second distance, the lower region may be defined as the first region and the upper region may be defined as the second region. The first region means the region in which the liquid level and the temperature of the molten metal are measured through the liquid level measuring unit 12 and the thermocouples 15. The second region means the upper stage of the flange part 18 and the region in which the lead wires, lines and the like for connecting the control unit 16, the liquid level measuring unit 12, and the thermocouples 15 are disposed. The first region and the second region may be spatially separated by means of the flange part 18. In the second region, terminals connected with lead wires, lines and the like may be disposed, and a free space may be filled with a mineral insulating material or the like such as magnesium oxide and then sealed and finished.

The flange part 18 may have a plurality of through holes 181 formed therein.

In the present embodiment, the through holes 181 may be formed to connect the liquid level measuring unit 12 and the thermocouples 15, which are in the first region, with the lead wires, lines and the like which are in the second region. This is indispensably required to operate the liquid level measuring device 10 through the control unit 16, and according to modified matters on design, a single type through hole 181 or plurality of through holes 181 may be formed. However, in order to enhance spatial separation efficiency of the first region and the second region, it is preferable not to form an additional through hole aside from the through holes 181 formed to be connected to the control unit 16.

Figure 9:
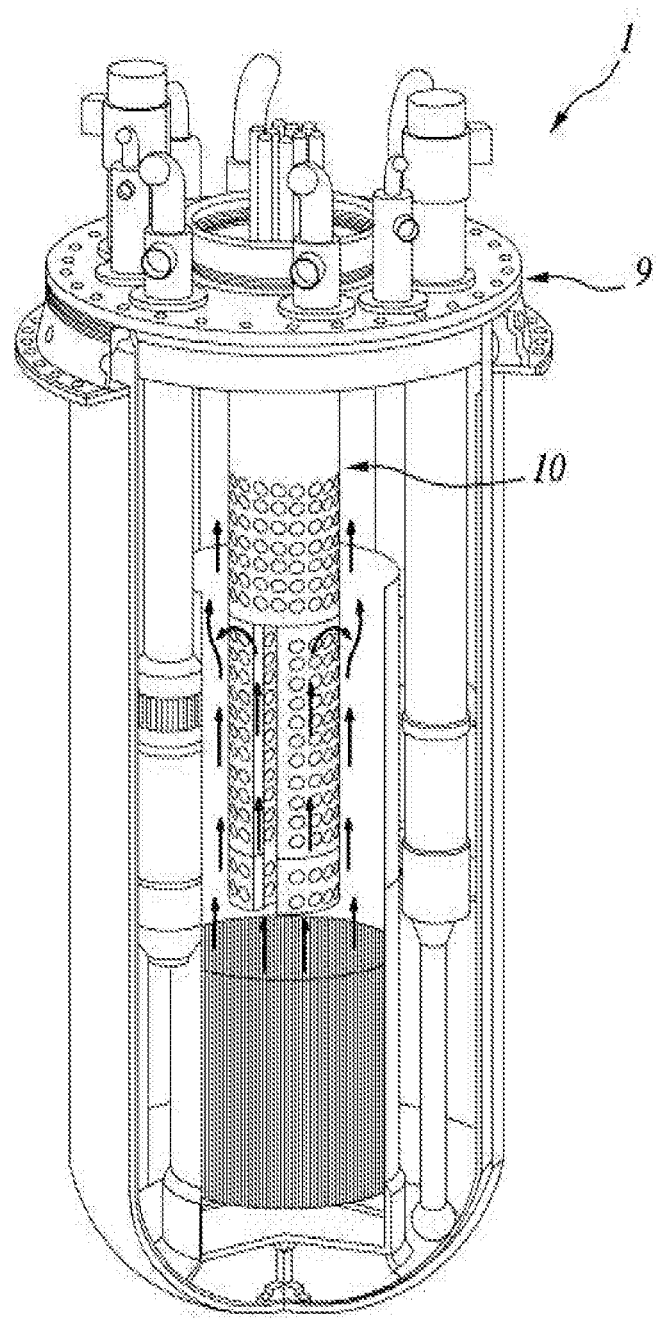
FIG. 9 shows a thermal system according to an exemplary embodiment of the present invention.

FIG. 9 shows a thermal system 1 according to an embodiment of the present invention. As described above, a molten metal level measuring device 10 may be included in a measuring apparatus for accurately measuring the liquid level and the temperature of a sealed space including a free liquid surface of a working fluid in a molten metal cooling nuclear reactor, a chemical plant, and industrial processing facility in which a molten metal is used as the working fluid. In addition, the molten metal level measuring device 10 may also be used as one type of a leak detector which is inserted into a sealed tank and an experimental container. As such, in this description, a higher-layer concept including the molten metal level measuring device 10 of the present invention is defined as a thermal system 1, and the concept is not limited to the aforementioned examples, but may be applied to all systems for measuring the liquid level of molten metal. The features relating to this will be described in detail with reference to FIG. 10.

Figure 10:
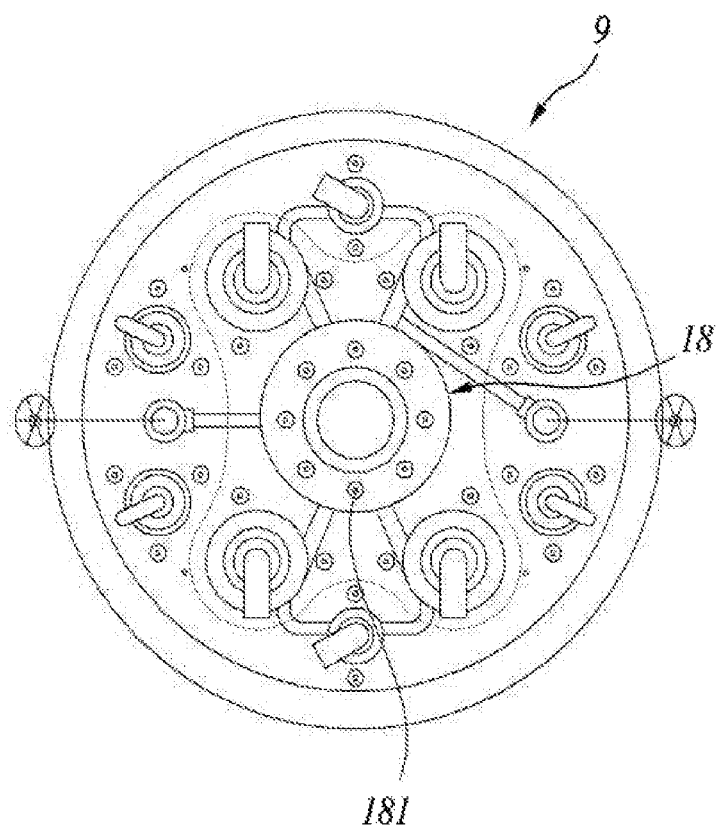
FIG. 10 is a plan view of an upper stage according to an exemplary embodiment of the present invention.

FIG. 10 is a plan view of an upper stage of a thermal system 1 according to an embodiment of the present invention. Referring to FIG. 10, also in the structure of a very complicated thermal system 1, the upper stage of a flange part 18 of the present invention has a minimum number of through holes 181 formed therein, and thus, a control part 16, thermocouples 15, and a liquid level measuring unit 12 may be connected. Accordingly, it can be found that the thermal system 1 and a molten metal level measuring device 10 could ensure separation characteristics, and temperature measurement and continuous liquid level measurement could easily be performed. This may be understood as a factor for improving the reliability of information measured from the molten metal level measuring device 10.

In addition, the molten metal level measuring device 10 may prevent, by means of the flange part 18, a leak of inside working fluid due to a factor such as an increase in inner pressure of a tank, an experiment container, and the like which constitute the thermal system 1. In this case, the molten metal level measuring device 10 may be used as a leak detector for detecting a change in the height of free liquid surface of the working fluid in a structure, such as a double wall pipe or a double wall vessel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, the scope of the present invention should not be construed to be limited by the aforementioned embodiments, but be determined not also by the following claims but also by all modifications and modified forms derived from concepts equivalent to the claims.

We claim:

1. A molten metal level measuring device in a continuous molten metal level measuring device using temperature compensation, the molten metal level measuring device comprising:
   a cylindrical bobbin;
   a liquid level measuring part helically wound around an outer surface of the bobbin;
   a circular inner cylinder in which the bobbin and the liquid level measuring part are located and which seals the bobbin and the liquid level measuring part from the outside and has the same axial direction as the bobbin;
   a cylindrical protective tube in which the inner cylinder is located, and which has the same axial direction as the bobbin and has one open end;

a plurality of thermocouples disposed extending in the axial direction in the space formed by the outer side of the inner cylinder and the inner side of the protective tube; and a control unit which controls the liquid level measuring part to measure a liquid level of the molten metal and outputs a corrected value of the liquid level measured from the liquid level measuring part on the basis of temperatures respectively measured by the plurality of thermocouples.

2. The molten metal level measuring device of claim 1, further comprising a connection part which connects the inner cylinder and the protective tube.

3. The molten metal level measuring device of claim 2, wherein the connection part is formed between the plurality of thermocouples.

4. The molten metal level measuring device of claim 1, wherein the protective tube has a plurality of through holes formed therein.

5. The molten metal level measuring device of claim 4, wherein the plurality of through holes each have a diameter of at least 4 mm.

6. The molten metal level measuring device of claim 4, wherein the protective tube has the plurality of through holes formed in an outer circumferential surface thereof within a first distance preset from one end thereof.

7. The molten metal level measuring device of claim 6, further comprising a flange part formed, at a preset second distance greater than a first distance from the one end of the protective tube, so as to divide a region inside the protective tube into a first region and a second region.

8. The molten metal level measuring device of claim 7, wherein
the first region is an inside of the protective tube within the preset second distance from the one end of the protective tube, and
the flange part is formed so as to seal the second region from the first region.

9. The molten metal level measuring device of claim 7, wherein the preset second distance is greater than the length of the inner cylinder.

10. The molten metal level measuring device of claim 7, wherein the thermocouples each comprises:
a fixed end connected to the flange part; and
a measuring end extending from the flange part.

11. The molten metal level measuring device of claim 10, wherein a length of the measuring end extending from the flange part is adjusted.

12. The molten metal level measuring device of claim 10, wherein the thermocouples are sealed thermocouples each having the measuring end sealed from the outside.

13. The molten metal level measuring device of claim 7, wherein the flange part has a plurality of through holes formed therein.

14. The molten metal level measuring device of claim 1, wherein the bobbin is made of a Grade 91-based metal material.

15. The molten metal level measuring device of claim 1, wherein the liquid level measuring part further comprises:
a first coil to which an alternating current is applied from the control unit; and
a second coil which generates an inductive current on the basis of the alternating current.

16. The molten metal level measuring device of claim 15, wherein the first and second coils are each formed in a single coil and are alternately wound side by side in the axial direction of the bobbin.

17. The molten metal level measuring device of claim 1, wherein the inner cylinder is composed of a material through which current and an electromagnetic field easily pass.

18. The molten metal level measuring device of claim 1, wherein the plurality of thermocouples extend in different lengths and are disposed.

19. The molten metal level measuring device of claim 1, wherein the control unit calculates the corrected liquid level of the molten metal on the basis of temperature information about the molten metal, the temperature information being measured from at least one among the plurality of thermocouples.

20. The molten metal level measuring device of claim 1, wherein the control unit calculates the corrected liquid level of the molten metal by continuously collecting the temperature information about the molten metal, the temperature information being measured from the plurality of thermocouples.

21. A thermal system having a molten metal level measuring device of claim 1 inserted into the thermal system to measure the liquid level of a working fluid.

* * * * *